United States Patent
Shen et al.

(10) Patent No.: US 11,296,321 B2
(45) Date of Patent: Apr. 5, 2022

(54) NEGATIVE ELECTRODE PLATE AND BATTERY

(71) Applicant: CONTEMPORARY AMPEREX TECHNOLOGY CO., LIMITED, Ningde (CN)

(72) Inventors: Yuliang Shen, Ningde (CN); Meng Kang, Ningde (CN); Tianquan Peng, Ningde (CN); Jiazheng Wang, Ningde (CN); Libing He, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 328 days.

(21) Appl. No.: 16/395,707

(22) Filed: Apr. 26, 2019

(65) Prior Publication Data
US 2019/0341612 A1    Nov. 7, 2019

(30) Foreign Application Priority Data

May 4, 2018  (CN) .......................... 201810418614.X

(51) Int. Cl.
*H01M 4/583*  (2010.01)
*H01M 4/133*  (2010.01)
*C01B 32/20*  (2017.01)
*H01M 4/02*  (2006.01)

(52) U.S. Cl.
CPC .............. *H01M 4/583* (2013.01); *C01B 32/20* (2017.08); *H01M 4/133* (2013.01); *C01B 2204/22* (2013.01); *C01B 2204/32* (2013.01); *C01P 2004/20* (2013.01); *C01P 2006/10* (2013.01); *C01P 2006/40* (2013.01); *H01M 2004/021* (2013.01); *H01M 2004/027* (2013.01)

(58) Field of Classification Search
CPC ................. H01M 4/133; H01M 4/583; H01M 2004/021
See application file for complete search history.

(56) References Cited

U.S. PATENT DOCUMENTS

| | | | |
|---|---|---|---|
| 9,656,868 B2 | 5/2017 | Nishi et al. | |
| 2010/0092864 A1 | 4/2010 | Yokomizo et al. | |
| 2015/0194668 A1* | 7/2015 | Ueda ..................... | H01M 4/386 |
| | | | 429/231.4 |
| 2016/0276657 A1 | 9/2016 | Song et al. | |
| 2017/0077486 A1* | 3/2017 | Ishii .................... | H01M 10/058 |
| 2020/0058923 A1* | 2/2020 | Minami ............ | H01M 10/0566 |

FOREIGN PATENT DOCUMENTS

| | | | | |
|---|---|---|---|---|
| CN | 102637859 A | * | 8/2012 | |
| CN | 102637859 A | | 8/2012 | |
| CN | 103199251 A | | 7/2013 | |
| CN | 103259046 B | | 8/2013 | |
| CN | 105026312 A | | 11/2015 | |
| CN | 105215331 A | | 1/2016 | |
| CN | 103199251 B | | 8/2016 | |
| CN | 108878765 A | * | 11/2018 | |
| EP | 2899782 A1 | | 7/2015 | |
| WO | WO-2013128829 A1 | * | 9/2013 | ............ H01M 4/133 |
| WO | WO-2014/024473 A1 | | 2/2014 | |

OTHER PUBLICATIONS

Contemporary Amperex Technology Co. Limited, 1st Office Action, CN201810418614.X, dated Dec. 29, 2018, 7 pgs.

Contemporary Amperex Technology Co., Limited, The Extended European Search Report, EP19170798.3, dated Jul. 16, 2019, 10 pgs.

* cited by examiner

*Primary Examiner* — Jonathan G Jelsma

(74) *Attorney, Agent, or Firm* — Morgan, Lewis & Bockius LLP

(57) ABSTRACT

The present disclosure provides a negative electrode plate and a battery, the negative electrode plate comprises a negative current collector and a negative film, the negative film is provided on at least one surface of the negative current collector and comprises a negative active material, the negative active material comprises graphite, and the negative electrode plate satisfies a relationship: $0.27 \leq P \times 1.1/G + 2/V_{OI} \leq 1.3$, P represents a porosity of the negative film, G represents a graphitization degree of the negative active material, $V_{OI}$ represents an OI value of the negative film. The battery of the present disclosure can have the characteristics of long cycle life, high energy density and excellent dynamics performance at the same time.

13 Claims, No Drawings

NEGATIVE ELECTRODE PLATE AND BATTERY

CROSS-REFERENCE TO RELATED APPLICATIONS

The present application claims priority to Chinese patent application No. CN201810418614.X, filed on May 4, 2018, which is incorporated herein by reference in its entirety.

FIELD OF THE PRESENT DISCLOSURE

The present disclosure relates to the field of battery, and particularly relates to a negative electrode plate and a battery.

BACKGROUND OF THE PRESENT DISCLOSURE

Rechargeable batteries represented by lithium-ion batteries are widely used in new energy automotives due to significant characteristics of light weight, high energy density, no pollution, none memory effect, long service life and the like. However, a longer charging time is one of the key factors limiting the rapid popularizion of the new energy automotives. From the viewpoint of technical principle, a core of the fast charging technology of the battery is how to improve the transferring speed of the lithium ions between the positive electrode plate and the negative electrode plate by harmonizing the chemical system and optimizing the design of the chemical system. If the negative electrode plate cannot bear a high current charging, the lithium metal will be precipitated on the negative electrode plate when the battery is charged under a large charging rate, and a large amount of side-products are also generated on the surface of the negative electrode plate, which affects the cycle life and the safety performance of the battery. Therefore, the key of the fast charging technology of the battery lies in the design of the negative active material and the design of the negative electrode plate.

At present, the negative active material used in the fast-charging battery mainly comprises lithium titanate and amorphous carbon in the industry, although the rate performance thereof is better, the energy density of the battery using the aforementioned two negative active materials is lower, which is unable to meet present use demands.

Therefore, how to obtain a fast charging capability without compromising the energy density is the key in the design of the battery.

SUMMARY OF THE PRESENT DISCLOSURE

In view of the problem existing in the background, an object of the present disclosure is to provide a negative electrode plate and a battery, which can have the characteristics of long cycle life, high energy density and excellent dynamics performance at the same time.

In order to achieve the above object, in a first aspect of the present disclosure, the present disclosure provides a negative electrode plate, which comprises a negative current collector and a negative film, the negative film is provided on at least one surface of the negative current collector and comprises a negative active material. The negative active material comprises graphite, and the negative electrode plate satisfies a relationship: $0.27 \leq P \times 1.1/G + 2/V_{OI} \leq 1.3$, P represents a porosity of the negative film, G represents a graphitization degree of the negative active material, $V_{OI}$ represents an OI value of the negative film.

In a second aspect of the present disclosure, the present disclosure provides a battery, which comprises a positive electrode plate, a negative electrode plate, an electrolyte and a separator, and the negative electrode plate is the negative electrode plate according to the first aspect of the present disclosure.

Compared with the existing technologies, the present disclosure at least includes the following beneficial effects: in the present disclosure, by matching the relationship among the graphitization degree of the negative active material, the porosity of the negative film and the OI value of the negative film, the battery having the characteristics of long cycle life, high energy density and excellent dynamics performance at the same time is obtained.

DETAILED DESCRIPTION

Hereinafter a negative electrode plate and a battery according to the present disclosure are described in detail.

Firstly, a negative electrode plate according to a first aspect of the present disclosure is described. The negative electrode plate comprises a negative current collector and a negative film, the negative film is provided on at least one surface of the negative current collector and comprises a negative active material. The negative active material comprises graphite, and the negative electrode plate satisfies a relationship: $0.27 \leq P \times 1.1/G + 2/V_{OI} \leq 1.3$, P represents a porosity of the negative film, G represents a graphitization degree of the negative active material, $V_{OI}$ represents an OI value of the negative film.

The negative electrode plate needs to undergo the following three electrochemical processes during the charging process of the battery: (1) the active ions (such as lithium ions, sodium-ions and the like) deintercalate from the positive active material and enter into the electrolyte, and then enter into the porous structure of the negative film along with the electrolyte, so that a liquid phase conduction process of the active ions in the porous structure of the negative film is completed, and the liquid phase conduction process comprises a liquid phase diffusion process and an electromigration process; (2) the active ions exchange charges with the electrons on the surface of the negative active material; (3) the active ions enter into the crystal structure of the negative active material from the surface of the negative active material through a solid phase conduction process.

The energy density of the battery is related to the graphitization degree of the negative active material, the higher the graphitization degree of the negative active material is, the closer the crystal structure of the negative active material to perfect layered structure of the ideal graphite is, the higher the ordering degree of the negative active material is, the less the defects (such as fault, dislocation and the like) in the crystal structure of the negative active material is, the higher the capacity pergram of the negative active material is, and the less the needed amount of the negative active materials to achieve the targeted capacity in the design of the battery is, therefore the higher the graphitization degree of the negative active material is, the more beneficial to improve the energy density of the battery is. However, the graphitization degree of the negative active material is higher, the solid phase conduction process of the active ions in the negative active material is affected, and it is more difficult for the intercalation and the deintercalation of the active ions, the dynamics performance of the battery is worse, which is not beneficial for the battery to be charged under a large rate.

From the viewpoint of the electrode plate, the larger the porosity of the negative film is, the more developed the porous structure of the negative film is, the better the infiltration of the electrolyte is, the faster the liquid phase conduction speed of the active ions is, the more easily the active ions to be reduced so as to prevent the dendrite from forming on the surface of the negative electrode plate is when the battery is charged under a large rate, therefore the larger the porosity of the negative film is, the better the dynamics performance of the battery is, the more beneficial for the battery to be charged under a large rate is. However, when the porosity of the negative film is larger, the energy density of the battery will be negatively affected very obviously.

The higher the isotropy degree of the negative film is, the smaller the OI value of the negative film is, the more the end faces capable of intercalating the active ions in the negative film is, the more the amount of the active sites in the negative film is, the better the dynamics performance of the battery is, and the more beneficial for the battery to be charged under a large rate is. However, when the amount of the end faces capable of intercalating the active ions in the negative film increases to a certain extent, the tolerance of the negative active material on the exfoliation of the organic solvent (such as the electrolyte) is worse, that is the exfoliation tolerance of the negative active material is decreased, the initial coulombic efficiency loss and the irreversible capacity loss of the battery are significantly increased, which seriously affects the cycle life of the battery; and moreover, the increase of the isotropy degree of the negative film will also decrease the energy density of the battery.

There is a significant limitation to obtain a battery having long cycle life, high energy density and excellent dynamics performance when just from the viewpoint of alone optimization of the respective parameters above. In the negative electrode plate of the present disclosure, the graphitization degree of the negative active material represented by G, the porosity of the negative film represented by P and the OI value of the negative film represented by $V_{OI}$ are considered together, and when the negative electrode plate satisfies a relationship $0.27 \leq P \times 1.1/G + 2/V_{OI} \leq 1.3$, the battery may have the characteristics of long cycle life, high energy density and excellent dynamics performance at the same time.

Preferably, the negative electrode plate of the present disclosure satisfies a relationship: $0.45 \leq P \times 1.1/G + 2/V_{OI} \leq 0.75$.

In the negative electrode plate according to the first aspect of the present disclosure, preferably, the graphitization degree of the negative active material represented by G is 70%-99.9%; more preferably, the graphitization degree of the negative active material represented by G is 89%-99.9%.

In the negative electrode plate according to the first aspect of the present disclosure, preferably, the porosity of the negative film represented by P is 20%-60%; more preferably, the porosity of the negative film represented by P is 25%-45%.

In the negative electrode plate according to the first aspect of the present disclosure, preferably, the OI value of the negative film represented by $V_{OI}$ is 1~100; more preferably, the OI value of the negative film represented by $V_{OI}$ is 10~70.

It should be noted that, an average particle diameter of the negative active material represented by D50 and an OI value of a powder of the negative active material represented by $G_{OI}$ both will effect the OI value of the negative film represented by $V_{OI}$ to an extent, therefore the desired $V_{OI}$ may be obtained by changing the value of D50 and the value of $G_{OI}$. When other conditions are the same, the larger the average particle diameter of the negative active material represented by D50 is, the larger the OI value of the negative film represented by $V_{OI}$ is; the larger the OI value of the powder of the negative active material represented by $G_{OI}$ is, the larger the OI value of the negative film represented by $V_{OI}$ is. The OI value of the negative film represented by $V_{OI}$ may also be changed by using magnetic field inducing technique during the coating process of the negative slurry so as to artificially induce the arrangement of the negative active materials in the negative electrode plate. The OI value of the negative film represented by $V_{OI}$ may also be changed by adjusting a pressing density of the negative film during the cold pressing process so as to change the arrangement of the negative active materials in the negative electrode plate.

Preferably, the average particle diameter of the negative active material represented by D50 is 3 μm~20 μm. More preferably, the average particle diameter of the negative active material represented by D50 is 5 μm~12 μm.

Preferably, the OI value of the powder of the negative active material represented by $G_{OI}$ is 0.5~7. More preferably, the OI value of the powder of the negative active material represented by $G_{OI}$ is 2~4.5.

Preferably, the pressing density of the negative film represented by PD is 0.8 g/cm³~2.0 g/cm³. More preferably, the pressing density of the negative film represented by PD is 1.0 g/cm³~1.6 g/cm³.

In the negative electrode plate according to the first aspect of the present disclosure, the graphite is one or more selected from a group consisting of artificial graphite and natural graphite. The negative active material may further comprise one or more selected from a group consisting of soft carbon, hard carbon, carbon fiber, mesocarbon microbeads, silicon-based material, tin-based material and lithium titanate besides the graphite.

In the negative electrode plate according to the first aspect of the present disclosure, the graphitization degree of the negative active material represented by G may be obtained by a X-ray powder diffractometer (X'pert PRO), an interlayer space of the graphite represented by $d_{002}$ is obtained according to the general rules for X-ray diffractometric analysis JIS K 0131-1996 and the determination method of artificial graphite lattice parameter JB/T4220-2011, and the graphitization degree of the negative active material is then obtained according to an equation $G=(0.344-d_{002})/(0.344-0.3354)$.

The porosity of the negative film represented by P may be obtained by the gas replacement method, the porosity of the negative film is obtained according to an equation $P=(V_1-V_2)/V_1 \times 100\%$, $V_1$ represents an apparent volume of the negative film, $V_2$ represents a real volume of the negative film.

The OI value of the negative film represented by $V_{OI}$ may be obtained by a X-ray powder diffractometer (X'pert PRO), a X-ray diffraction pattern of the negative film is obtained according to the general rules for X-ray diffractometric analysis JIS K 0131-1996 and the determination method of artificial graphite lattice parameter JB/T4220-2011, and the OI value of the negative film is obtained according to an equation $V_{OI}=C_{004}/C_{110}$, $C_{004}$ represents characteristic diffraction peak area of (004) crystal plane, $C_{110}$ represents characteristic diffraction peak area of (110) crystal plane.

The average particle diameter of the negative active material represented by D50 may be measured by a laser diffraction particle size analyzer (Mastersizer 3000), D50 means that the whole volume of the particles having a particle diameter smaller than the value of D50 is 50% of the whole volume of all the particles.

Next a battery according to a second aspect of the present disclosure is described. The battery comprises a positive electrode plate, a negative electrode plate, an electrolyte and a separator, and the negative electrode plate is the negative electrode plate according to the first aspect of the present disclosure.

The inventors further found that, when the battery further satisfies a relationship $2.2 \leq D50/CB \leq 18$ in the design process of the battery, the comprehensive performances of the battery can be further improved. D50 represents the average particle diameter of the negative active material with a unit of CB represents a capacity excess ratio of the battery. If the value of D50/CB is less than 2.2, D50 may be smaller or the value of CB may be larger, at this case the stirring process and the coating process of the negative slurry will be difficult, and also the redundant negative active material will seriously affect the energy density of the battery. If the value of D50/CB is more than 18, D50 may be larger or the value of CB may be smaller, there is a great advantage on the energy density of the battery, however, the solid phase conduction speed of the active ions in the particle having a larger particle diameter is decreased, which has a significant effect on the performance of the battery while charged under a large rate.

Preferably, the battery of the present disclosure satisfies a relationship: $5.0 \leq D50/CB \leq 13.0$.

In the battery according to the second aspect of the present disclosure, preferably, the capacity excess ratio of the battery represented by CB is 0.8~1.8; more preferably, the capacity excess ratio of the battery represented by CB is 1.1~1.4.

The capacity excess ratio of the battery represented by CB represents a ratio of a capacity of the negative electrode plate to a capacity of the positive electrode plate under the same area.

In the battery according to the second aspect of the present disclosure, the positive electrode plate comprises a positive current collector and a positive film, the positive film is provided on at least one surface of the positive current collector and comprises a positive active material, the type and the specific composition of the positive electrode plate are not specifically limited and may be selected based on actual demands.

It should be noted that, the battery according to the second aspect of the present disclosure may be a lithium-ion battery, a sodium-ion battery and any other battery using the negative electrode plate according to the first aspect of the present disclosure.

When the battery is the lithium-ion battery, the positive active material may be selected from lithium cobalt oxide, lithium nickel oxide, lithium manganese oxide, lithium nickel manganese oxide, lithium nickel cobalt manganese oxide, lithium nickel cobalt aluminum oxide and olivine-type lithium-containing phosphate, but the present disclosure is not limited to these materials, other conventionally known materials that can be used as the positive active material of the lithium-ion battery can also be used. These positive active materials may be used alone or may be used two or more of them in combination. Preferably, the positive active material may be one or more selected from a group consisting of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ and $LiMnPO_4$.

When the battery is a sodium-ion battery, the positive active material may be selected from transition metal oxide $Na_xMO_2$ (M represents transition metal, preferably, M is one or more selected from a group consisting of Mn, Fe, Ni, Co, V, Cu and Cr, $0<x\leq1$), polyanion-type material (phosphate-type, fluorophosphate-type, pyrophosphate-type and sulfate-type) and prussian blue material, but the present disclosure is not limited to these materials, other conventionally known materials that can be used as the positive active material of the sodium-ion battery can also be used. These positive active materials may be used alone or may be used two or more of them in combination. Preferably, the positive active material may be one or more selected from a group consisting of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, prussian blue material and a material with a general formula of $A_aM_b(PO_4)_cO_xY_{3-x}$ (A is one or more selected from a group consisting of $H^+$, $Na^+$, $K^+$ and $NH_4^+$; M represents transition metal cation, preferably, M is one or more selected from a group consisting of V, Ti, Mn, Fe, Co, Ni, Cu and Zn; Y represents anion of halogen, preferably, Y is one or more selected from a group consisting of F, Cl and Br; $0<a\leq4$, $0<b\leq2$, $1\leq c\leq3$, $0\leq x\leq2$).

In the battery according to the second aspect of the present disclosure, the type of the separator is not specifically limited, the separator may be any separator used in existing batteries, for example, the separator may be a polyethylene membrane, a polypropylene membrane, a polyvinylidene fluoride membrane and a multilayer composite membrane thereof, but the present disclosure is not limited thereto.

In the battery according to the second aspect of the present disclosure, the specific type and the specific composition of the electrolyte are not specifically limited and may be selected based on actual demands.

Hereinafter the present disclosure will be described in detail taking a lithium-ion battery as an example in combination with specific examples. It should be noted that, the examples described in the present disclosure are only used for explaining the present disclosure, and are not intended to limit the present disclosure.

Batteries of examples 1-18 and comparative examples 1-2 were all prepared in accordance with the following preparation method.

(1) Preparation of a Positive Electrode Plate

NCM523 (positive active material), acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on aluminum foil (positive current collector), drying was then performed under room temperature and continual drying was performed in an oven, which was then followed by cold pressing and plate cutting, finally the positive electrode plate was obtained.

(2) Preparation of a Negative Electrode Plate

Graphite or a mixer of graphite and other active materials with a certain mass ratio (negative active material), acetylene black (conductive agent), CMC (thickening agent) and SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on copper foil (negative current collector), drying was then performed under room temperature and continual drying was performed in an oven, which was then followed by cold pressing and plate cutting, finally the negative electrode plate was obtained.

(3) Preparation of an Electrolyte

Ethylene carbonate (EC), ethyl methyl carbonate (EMC) and diethyl carbonate (DEC) according to a volume ratio of 1:1:1 were mixed together to obtain an organic solvent, then sufficiently dried $LiPF_6$ (lithium salt) was dissolved into the mixed organic solvent to obtain an electrolyte, and a concentration of the electrolyte was 1 mol/L.

(4) Preparation of a Separator

The separator was a polyethylene membrane.

(5) Preparation of a Lithium-Ion Battery

The positive electrode plate, the separator and the negative electrode plate were laminated in order, the separator was positioned between the positive electrode plate and the negative electrode plate so as to separate the positive electrode plate from the negative electrode plate, then the positive electrode plate, the separator and the negative electrode plate were wound together to form an electrode assembly, then the electrode assembly was put into a case, which was followed by baking, electrolyte injection, vacuum packaging, standby, formation, shaping and the like, finally a lithium-ion battery was obtained.

Hereinafter test processes of the lithium-ion batteries were described.

(1) Testing of the Dynamics Performance:

At 25° C., the lithium-ion batteries prepared in the examples and the comparative examples were fully charged at a constant current of 4 C and fully discharged at a constant current of 1 C for 10 cycles, then the lithium-ion batteries were fully charged at a constant current of 4 C, then the negative electrode plates were disassembled from the lithium-ion batteries, and the lithium precipitation on the surface of each negative electrode plate was observed. The lithium-precipitation area of less than 5% was considered to be slight lithium precipitation, the lithium-precipitation area of 5% to 40% was considered to be moderate lithium precipitation, and the lithium-precipitation area of more than 40% was considered to be serious lithium precipitation.

(2) Testing of the Cycle Performance:

At 25° C., the lithium-ion batteries prepared in the examples and the comparative examples were charged at a constant current of 3 C and discharged at a constant current of 1 C, the fully charging/discharging cycle process was repeated until the capacity of the lithium-ion battery decayed to 80% of the initial capacity, and the cycle number of the lithium-ion battery was recorded.

(3) Testing of the Measured Energy Density:

At 25° C., the lithium-ion batteries prepared in the examples and the comparative examples were fully charged at a constant current of 1 C and fully discharged at a constant current of 1 C, the measured discharge capacity at this time was recorded; at 25° C., the lithium-ion batteries were weighed by a electronic balance. And the measured energy density of the lithium-ion battery was a ratio of the measured discharge capacity of lithium-ion battery discharged at 1 C to the weight of the lithium-ion battery. When the measured energy density was less than 80% of the targeted energy density, the measured energy density of the battery was considered to be very low; when the measured energy density was more than or equal to 80% of the targeted energy density and less than 95% of the targeted energy density, the measured energy density of the battery was considered to be lower; when the measured energy density was more than or equal to 95% of the targeted energy density and less than 105% of the targeted energy density, the measured energy density of the battery was considered to be moderate; when the measured energy density was more than or equal to 105% of the targeted energy density and less than 120% of the targeted energy density, the measured energy density of the battery was considered to be higher; when the measured energy density was more than or equal to 120% of the targeted energy density, the measured energy density of the battery was considered to be very high.

TABLE 1

Parameters and test results of examples 1-18 and comparative examples 1-2

| | Negative active material | Graphitization degree (G) | Porosity (P) | $V_{OI}$ | D50 (μm) | CB | P × 1.1/G + $2/V_{OI}$ | D50/CB | Measured energy density | Dynamics performance | Cycle number |
|---|---|---|---|---|---|---|---|---|---|---|---|
| Example 1 | graphite | 99% | 30% | 130 | 8 | 1.2 | 0.35 | 6.7 | higher | slight lithium precipitation | 2549 |
| Example 2 | graphite | 97% | 29% | 120 | 8 | 1.2 | 0.35 | 6.7 | higher | slight lithium precipitation | 2689 |
| Example 3 | graphite | 94% | 30% | 20 | 8 | 1.2 | 0.45 | 6.7 | moderate | no lithium precipitation | 3221 |
| Example 4 | graphite | 89% | 40% | 45 | 8 | 1.2 | 0.54 | 6.7 | moderate | no lithium precipitation | 3300 |
| Example 5 | graphite | 89% | 40% | 12 | 8 | 1.2 | 0.66 | 6.7 | moderate | no lithium precipitation | 3331 |
| Example 6 | graphite | 82% | 40% | 10 | 8 | 1.2 | 0.74 | 6.7 | moderate | no lithium precipitation | 3128 |
| Example 7 | graphite | 82% | 50% | 12 | 8 | 1.2 | 0.84 | 6.7 | lower | no lithium precipitation | 2978 |
| Example 8 | graphite | 72% | 50% | 4 | 8 | 1.2 | 1.26 | 6.7 | lower | no lithium precipitation | 2787 |
| Example 9 | graphite | 94% | 40% | 15 | 3 | 1.6 | 0.60 | 1.9 | lower | no lithium precipitation | 2678 |
| Example 10 | graphite | 94% | 40% | 15 | 4 | 1.7 | 0.60 | 2.4 | lower | no lithium precipitation | 2760 |
| Example 11 | graphite | 94% | 40% | 15 | 8 | 1.5 | 0.60 | 5.3 | moderate | no lithium precipitation | 2869 |
| Example 12 | graphite | 94% | 40% | 15 | 10 | 1.2 | 0.60 | 8.3 | moderate | no lithium precipitation | 3212 |
| Example 13 | graphite | 94% | 40% | 15 | 14 | 1.1 | 0.60 | 12.7 | moderate | no lithium precipitation | 3001 |

TABLE 1-continued

Parameters and test results of examples 1-18 and comparative examples 1-2

| | Negative active material | Graphitization degree (G) | Porosity (P) | $V_{OI}$ | D50 (μm) | CB | $P \times 1.1/G + 2/V_{OI}$ | D50/CB | Measured energy density | Dynamics performance | Cycle number |
|---|---|---|---|---|---|---|---|---|---|---|---|
| Example 14 | graphite | 94% | 40% | 15 | 17 | 1.04 | 0.60 | 16.3 | moderate | slight lithium precipitation | 2701 |
| Example 15 | graphite | 94% | 40% | 15 | 20 | 1.04 | 0.60 | 19.2 | moderate | slight lithium precipitation | 2638 |
| Example 16 | graphite + soft carbon (7:3) | 75% | 40% | 15 | 8 | 1.2 | 0.72 | 6.7 | lower | no lithium precipitation | 2587 |
| Example 17 | graphite + hard carbon (7:3) | 73% | 40% | 18 | 8 | 1.2 | 0.71 | 6.7 | lower | no lithium precipitation | 2427 |
| Example 18 | graphite + silicon (7:3) | 94% | 40% | 25 | 8 | 1.2 | 0.55 | 6.7 | higher | moderate lithium precipitation | 2287 |
| Comparative example 1 | graphite | 99% | 21% | 151 | 8 | 1.2 | 0.25 | 6.7 | higher | serious lithium precipitation | 621 |
| Comparative example 2 | graphite | 71% | 62% | 4.8 | 8 | 1.2 | 1.38 | 6.7 | very low | no lithium precipitation | 660 |

The batteries of examples 1-18 might have the characteristics of long cycle life, high energy density and excellent dynamics performance at the same time by reasonably adjusting the relationship among the graphitization degree of the negative active material represented by G, the porosity of the negative film represented by P and the OI value of the negative film represented by $V_{OI}$ and making the value of $P \times 1.1/G + 2/V_{OI}$ be between 0.27 and 1.3.

The preferred range of the graphitization degree of the negative active material represented by G was 70%~99.9%, the preferred range of the porosity of the negative film represented by P was 20%~60%, the preferred range of the OI value of the negative film represented by $V_{OI}$ was 1~100. And what the applicant needed to explain was that when one or more of the graphitization degree of the negative active material represented by G, the porosity of the negative film represented by P and the OI value of the negative film represented by $V_{OI}$ did not fall within the above preferred ranges, but the value of $P \times 1.1/G + 2/V_{OI}$ was between 0.27 and 1.3, the battery might still have the characteristics of long cycle life, high energy density and excellent dynamics performance at the same time.

For example, in example 1 and example 2, the OI value of the negative film represented by $V_{OI}$ did not fall within the above preferred range, but the value of $P \times 1.1/G + 2/V_{OI}$ was between 0.27 and 1.3 by reasonably adjusting the graphitization degree of the negative active material represented by G and the porosity of the negative film represented by P, and the battery might still have the characteristics of long cycle life, high energy density and excellent dynamics performance at the same time.

In comparative example 1, the porosity of the negative film was lower, the infiltration of the electrolyte was worse, the liquid phase conduction resistance of the lithium ions was larger; and moreover, the OI value of the negative film was larger, the isotropy degree of the negative film was larger, the end faces capable of intercalating the lithium ions in the negative film was less, the charge exchange speed between the lithium ions and the electrons on the surface of the negative active material was slower; and the higher graphitization degree of the negative active material also made the solid phase conduction resistance of the lithium ions inside the negative active material larger. Therefore the graphitization degree of the negative active material, the porosity of the negative film and the OI value of the negative film in the negative electrode plate of comparative example 1 were unreasonably designed, the dynamics performance of the battery was very worse, and serious lithium precipitation occurred when the battery was charged under a large rate, and the cycle life of the battery was also greatly affected.

In comparative example 2, the graphitization degree of the negative active material was lower, the capacity pergram of the negative active material was lower, the porosity of the negative film was larger, the content of the negative active material on per unit area of the negative film was lower, which all had negative effects on the energy density of the battery. And moreover, the OI value of the negative film was smaller, the tolerance of the negative active material to the electrolyte was worse, various degrees of exfoliation easily occurred on the negative active materials under the function of the electrolyte, therefore the initial coulombic efficiency loss and the irreversible capacity loss of the battery were significantly increased, the cycle life of the battery was seriously affected, and the energy density of the battery was further decreased. Therefore the graphitization degree of the negative active material, the porosity of the negative film and the OI value of the negative film in the negative electrode plate of comparative example 2 were unreasonably designed, the energy density and the cycle life the battery were seriously affected.

Examples 9-15 further adjusted the relationship between the average particle diameter of the negative active material represented by D50 and the capacity excess ratio of the battery represented by CB, and when they satisfied a relationship $2.2 \leq D50/CB \leq 18$, the cycle life, the energy density and the dynamics performance of the battery might be further improved.

When the average particle diameter of the negative active material represented by D50 and the capacity excess ratio of the battery represented by CB were unreasonably designed and the lower limit value of D50/CB was less than 2.2, the smaller average particle diameter of the negative active material represented by D50 made the stirring process and the coating process of the negative slurry difficult, a superior product rate of the negative electrode plate was decreased; and moreover the capacity excess ratio of the battery represented by CB was larger, the amount of the negative active materials added in the negative electrode plate was larger, the availability of the negative active materials was decreased, therefore the energy density of the battery was lower. When the average particle diameter of the negative active material represented by D50 and the capacity excess ratio of the battery represented by CB were unreasonably designed and the upper limit value of D50/CB was more than 18, the larger average particle diameter of the negative active material represented by D50 decreased the solid phase conduction speed of the lithium ions, it was not beneficial for the battery to be charged under a large rate, and therefore the dynamics performance and the cycle life of the battery were worse. Therefore the comprehensive performances of the batteries prepared in example 9 and example 15 were worse than the comprehensive performances of the batteries prepared in examples 10-14, but still better than the comprehensive performances of the batteries prepared in comparative examples 1-2.

What is claimed:

1. A battery comprising a positive electrode plate, a negative electrode plate, an electrolyte and a separator, the negative electrode plate comprising a negative current collector and a negative film, the negative film being provided on at least one surface of the negative current collector and comprising a negative active material;
wherein
the negative active material consists of graphite, and the negative electrode plate satisfies a relationship: $0.27 \leq P \times 1.1/G + 2/V_{OI} \leq 1.3$, P represents a porosity of the negative film, G represents a graphitization degree of the negative active material, $V_{OI}$ represents an OI value of the negative film,
the OI value of the negative film represented by $V_{OI}$ is $15 \leq V_{OI} \leq 45$,
the porosity of the negative film represented by P is $40\% \leq P \leq 45\%$,
the battery satisfies a relationship: $5.0 \leq D50/CB \leq 13.0$, where D50 represents the average particle diameter of the negative active material with a unit of μm, CB represents a capacity excess ratio of the battery, and
the capacity excess ratio of the battery represented by CB is $1.2 \leq CB \leq 1.4$.

2. The battery according to claim 1, wherein the negative electrode plate satisfies a relationship: $0.45 \leq P \times 1.1/G + 2/V_{OI} \leq 0.75$.

3. The battery according to claim 2, wherein the negative electrode plate satisfies a relationship: $0.45 \leq P \times 1.1/G + 2/V_{OI} \leq 0.60$.

4. The battery according to claim 1, wherein an average particle diameter of the negative active material represented by D50 is 3 μm~20 μm.

5. The battery according to claim 4, wherein the average particle diameter of the negative active material represented by D50 is 4 μm~14 μm.

6. The battery according to claim 5, wherein the average particle diameter of the negative active material represented by D50 is 8 μm~14 μm.

7. The battery according to claim 1, wherein the graphitization degree of the negative active material represented by G is 89%~99.9%.

8. The battery according to claim 7, wherein the graphitization degree of the negative active material represented by G is 94%~97%.

9. The battery according to claim 1, wherein the OI value of the negative film represented by $V_{OI}$ is 18~45.

10. The battery according to claim 1, wherein an OI value of a powder of the negative active material represented by $G_{OI}$ is 2~4.5.

11. The battery according to claim 1, wherein a pressing density of the negative film represented by PD is 1.0 g/cm$^3$~1.6 g/cm$^3$.

12. The battery according to claim 1, wherein the battery satisfies a relationship: $8.3 \leq D50/CB \leq 12.7$.

13. The battery according to claim 1, wherein the positive electrode plate comprises a positive current collector and a positive film, the positive film is provided on at least one surface of the positive current collector and comprises a positive active material, the positive active material is one or more selected from a group consisting of lithium nickel cobalt manganese oxide and lithium nickel cobalt aluminum oxide.

* * * * *